SCREWDOWN SYSTEM FOR ROLLING MILL
Original Filed May 29, 1968
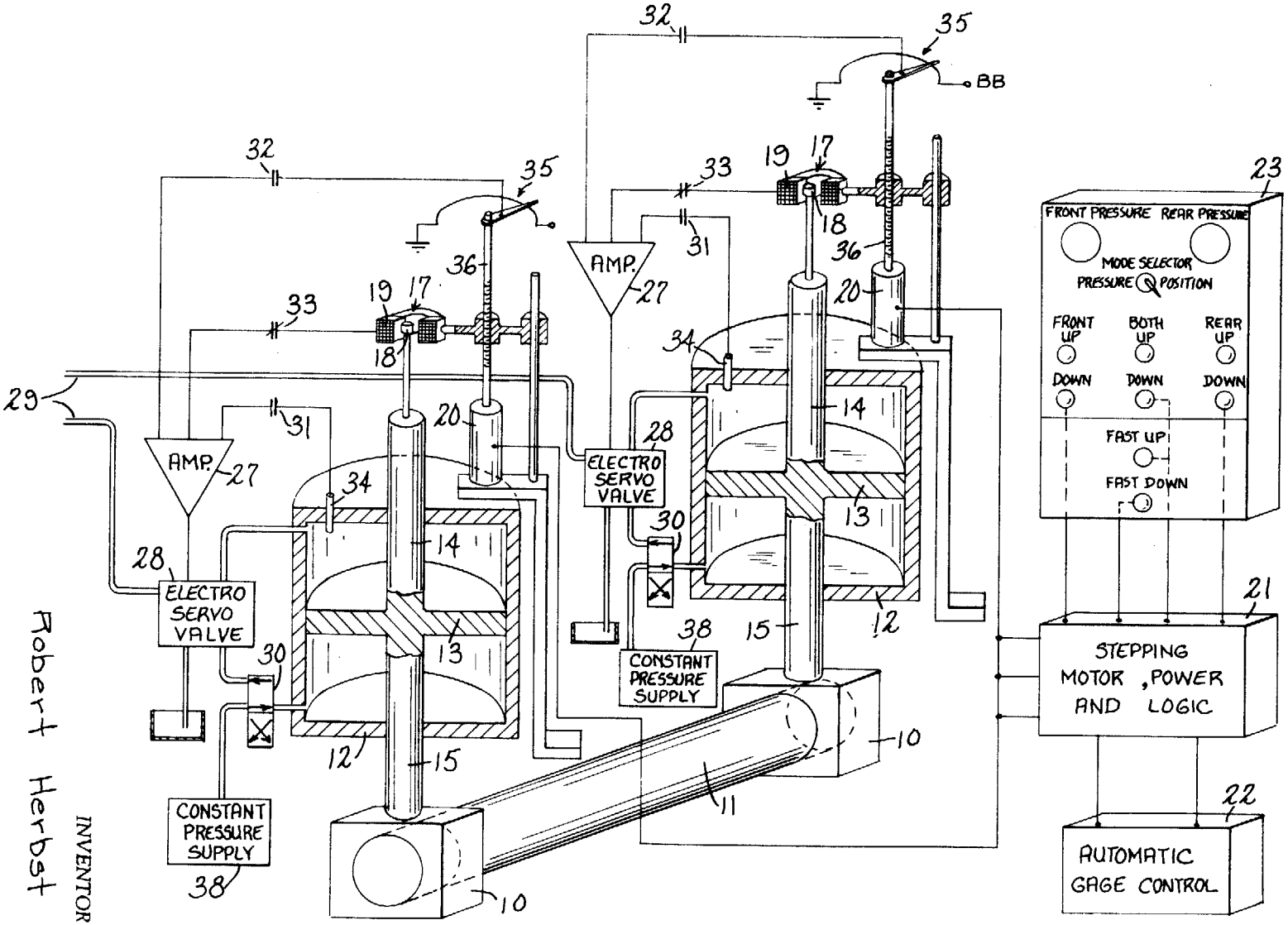
INVENTOR
Robert Herbst
BY De Lio and Montgomery
ATTORNEYS United States Patent Office Re. 28,248
Reissued Nov. 19, 1974

28,248

SCREWDOWN SYSTEM FOR ROLLING MILL

Robert Herbst, Cheshire, Conn., assignor to Textron, Inc., Providence, R.I.

Original No. 3,566,638, dated Mar. 2, 1971, Ser. No. 732,999, May 29, 1968. Application for reissue Mar. 20, 1972, Ser. No. 236,501
Int. Cl. B21b *37/08*
U.S. Cl. 72—8 5 Claims

Matter enclosed in heavy brackets [ ] appears in the original patent but forms no part of this reissue specification; matter printed in italics indicates the additions made by reissue.

ABSTRACT OF THE DISCLOSURE

A hydraulic screwdown system for a rolling mill. In particular, there is provided a double-acting hydraulic cylinder having its piston position to effect mill adjustment in accordance with a control signal. In one embodiment a displacement transducer is utilized to generate the control signal and in another of the embodiments, a pressure transducer is utilized in generating control signals.

This invention is directed to a new multi-purpose fast-responding hydraulic screwdown system particularly suitable for use on conventional rolling mills and, in particular, those using automatic gage control or predetermined percentage reduction control.

This invention provides a screwdown system which incorporates one of two independently movable hydraulic servo valve-controlled double-acting hydraulic cylinders. A hydraulic power unit is provided to supply the one or two servo valves. In addition, suitable controlling means are provided which employ stepping motors which are responsive to digital (pulse) signals provided by an automatic gage or manual control system. In particular, this invention is usable in conjunction with control systems for rolling mills disclosed in U.S. Pats. 3,054,311 issued Sept. 18, 1962 and 3,121,354 issued Feb. 18, 1964.

The screwdown system as disclosed herein, when provided with controlling means as in the aforementioned patents, may be operated in various modes of operation, namely position control, load control, pressure control or elongation control. This invention provides advantages over the prior art in that, by the use of separable double-acting hydraulic cylinders, rapid, accurate and predictable mill adjustments are achieved on either the independent cylinder or in tandem without the requirement of additional complex mechanical equipment, such as a tie-in clutch. In addition, with the use of the system described herein, pressure on the rolls of the mill may be either coordinated or adjusted rapidly in accordance with changing load conditions.

In view of the foregoing, it is an object of this invention to provide a new and improved mill control system.

Another object of this invention is to provide a new and improved mill control system which utilizes double acting hydraulic cylinders and a stepping motor responsive to digital (pulse) signals.

A further object of this invention is to provide a new and improved screwdown system which permits the use of a displacement sensor in its linear range of operation.

Still other objects and advantages of the invention will in part be obvious and will in part be apparent from the specification.

The invention accordingly comprises the features of construction, combination of elements and arrangements of parts which will be exemplified in the constructions hereinafter set forth and the scope of the invention will be indicated in the claims.

For a fuller understanding of the invention, reference is had to the following description, taken in connection with the accompanying drawing, in which there is diagrammatically illustrated the preferred mill hydraulic control system according to this invention.

Referring to the figure, there is shown diagrammatically at 10 roll journals for supporting a roll shown at 11. In the preferred embodiment, there are two double acting hydraulic cylinders provided at 12. Each of these cylinders includes a piston 13 to which are coupled upper and lower rods 14 and 15, respectively. The rods 15 bear upon the chocks 10 so as to press against the roll and move it in one direction to apply pressure against the material passing between roll 11 and another roll (not shown).

As mentioned previously, the system disclosed herein is operable in either a pressure or position mode of operation. For position control, displacement transducers 17 are provided, such as sold by Collins or Sanborn Div. of Hewlitt Packard Company. The transducers 17 provide an output signal depending on the position of a central core 18 with respect to an outer transformer coil shown at 19. As shown, the core 18 is supported from the top of rod 14, such that it will move either upwardly or downwardly, depending on the position of the chock 10. To effectively move the chock 10 and the roll 11, means must be provided for moving the outer portion 19 with respect to the core 18 in accordance with a control signal. In this invention, this is accomplished by the provision of a stepping motor 20 which is responsive to signals provided from a stepping motor power and logic control block shown at 21. The block 21 is responsive to an automatic gage control system block 22 (such as disclosed in the aforementioned U.S. patents). In addition, there is shown a block 23 for controlling the motor power logic. In essence, the motor power logic converts (in a well known manner) the digital signals provided by the automatic gage control to digital pulses which will step the motor 20 to control the position of the coil 19. It should be understood that the stepping motor may be mechanically operated by replacing the block 21 with a pulse source which provides a single pulse each time a pushbutton is depressed.

The signal from the coil 19 is then applied to an electronic amplifier 27 which controls an electronic servo valve 28. The valve 28 controls the flow of hydraulic fluid from a supply, the inlet pipes being shown at 29, through a magnetically controlled valve 30. The bottom position of valve 30 is used for position control, whereas the top portion of the valve 30 is used for pressure control.

In a case where position control is utilized, electrical switches shown at 31 and 32 are placed in the open position and an electrical switch 33 is placed in the closed position. When the system is operating as a pressure controlled system, the switch 33 is opened and the switches 31 and 32 are closed.

In order to provide pressure control, a pressure transducer 34 is provided, positioned in the topmost portion in hydraulic cylinder 12. The transducer 34 provides a signal which indicates the pressure within that portion of the hydraulic cylinder and indicates the amount of pressure being applied to the piston through the rod 15 and, therefore, directly proportional to mill operating force.

Command signals are provided by means of a pressure reference potentiometer, generally shown at 35, which is controlled through the shaft 36 of the stepper motor 20. In this manner, signals are provided through switches 31 and 32 and are combined (added) in the electronic amplifier 27. Under pressure control, as previously noted, the valve 30 is in position such that the pressure to the top portion of the cylinder 12 is controlled through the electronic servo valve 28, whereas fluid from a constant pressure supply 38 is provided to the bottom of the cylinder 12. In the pressure mode of operation, supply pressure is applied which is of a magnitude required to lift the roll when fluid under minimum pressure is applied to the top of the cylinder.

It will thus be seen that the objects set forth above, among those made apparent from the preceding description are efficiently attained and since certain changes may be made in the above construction without departing from the spirit and scope of the invention, it is intended that all matter contained in the foregoing description or shown in the accompanying drawings shall be interpreted as illustrative and not in a limiting sense.

It should also be understood that the following claims are intended to cover all the generic and specific features of the invention herein described and all statements of the scope of the invention which, as a matter of language, might be said to fall therebetween.

What I claim is:

1. In a screwdown system for a mill including [a roll] *rolls defining a roll gap,* means for supporting [a roll] *the rolls* and means for [causing said roll to move to effect mill adjustment] *controlling the position of one of said rolls to control the roll gap,* the improvement comprising a double-acting hydraulic cylinder means having a piston for providing [the] *a screwdown* force [to effect mill adjustment] *on one of said rolls,* servo valve means responsive to a command signal for controlling the flow of hydraulic fluid to position said cylinder, [means providing a rolling pressure reference signal, piston displacement sensing means for providing a signal indicative of piston displacement, and means for combining said reference signal and the displacement signal to derive the command signal] *means for predetermining the position and sensing displacement of said one of said rolls, comprising a core and coil movable relative to each other, and effective to emit a signal indicative of the relative positions, means for positioning one of said coil and core to predetermine the roll gap, the other of said coil and core being coupled to said piston for movement therewith, and means for applying the emitted signal to said servo valve as the command signal to control the roll gap.*

2. The arrangement of claim 1 wherein said *core is coupled to said piston* [displacement sensing means comprises a movable core positioned within a movable coil, said core and said coil coacting to provide an electrical command signal].

[3. The arrangement of claim 2, in which said core is coupled to said piston and movable therewith, and in which the position of said coil is adjustable with respect to said core.]

4. The arrangement of [claim 3] *claim 2* in which said [coil is positioned by] means [movable a predetermined step] *for positioning said coil is movable* in response to a pulse signal.

5. The arrangement of claim 4, in which said positioning means is a stepping motor.

6. In a control system for a mill including a roll, means for supporting the roll and holddown means for acting on the roll to effect mill adjustment; the improvement comprising a double acting hydraulic cylinder having a piston for providing the holddown force to effect mill adjustment, a hydraulic servo valve responsive to a command signal for controlling the flow of fluid to said cylinder to position said piston, means for sensing the pressure of the fluid in said cylinder and providing a signal responsive thereto, means for providing a rolling pressure reference signal and means for combining said pressure signal and said reference signal to provide the command signal to said servo valve.

References Cited

The following references, cited by the Examiner, are of record in the patented file of this patent or the original patent.

UNITED STATES PATENTS

| | | | |
|---|---|---|---|
| 3,157,073 | 11/1964 | Blain | 72—245 |
| 3,516,273 | 6/1970 | Stone | 72—21 |
| 3,416,341 | 12/1968 | Dey et al. | 72—21 X |
| 3,075,417 | 1/1963 | Blain | 72—240 X |
| 3,178,919 | 4/1965 | Varner | 72—9 |
| 3,285,049 | 11/1966 | Neumann | 72—246 |
| 3,389,588 | 6/1968 | Reinhardt et al. | 72—8 |
| 3,464,245 | 9/1969 | Dowsing et al. | 72—16 |
| 3,286,495 | 11/1966 | Diolot | 72—8 |

MILTON S. MEHR, Primary Examiner